United States Patent
De'Longhi et al.

(10) Patent No.: US 11,503,946 B2
(45) Date of Patent: Nov. 22, 2022

(54) MILK FROTHER AND COFFEE MACHINE THAT INCORPORATES SUCH A MILK FROTHER

(71) Applicant: De'Longhi Appliances S.R.L., Treviso (IT)

(72) Inventors: Giuseppe De'Longhi, Treviso (IT); Antonio Panciera, Treviso (IT); Stefano Quaresimin, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 413 days.

(21) Appl. No.: 16/633,906

(22) PCT Filed: Jul. 25, 2018

(86) PCT No.: PCT/EP2018/070238
§ 371 (c)(1),
(2) Date: Jan. 24, 2020

(87) PCT Pub. No.: WO2019/020722
PCT Pub. Date: Jan. 31, 2019

(65) Prior Publication Data
US 2021/0076869 A1    Mar. 18, 2021

(30) Foreign Application Priority Data
Jul. 27, 2017    (IT) .................... 102017000086645

(51) Int. Cl.
A47J 31/00    (2006.01)
A47J 31/44    (2006.01)
A47J 31/46    (2006.01)

(52) U.S. Cl.
CPC ....... *A47J 31/4485* (2013.01); *A47J 31/4403* (2013.01); *A47J 31/469* (2018.08)

(58) Field of Classification Search
CPC ................ A47J 31/4485; A47J 31/4403; A47J 31/4496; A47J 43/07; A47J 43/0711;
(Continued)

(56) References Cited

U.S. PATENT DOCUMENTS

2013/0000490 A1*  1/2013  De'Longhi ......... A47J 31/4489
                                                        99/323.1
2013/0319259 A1* 12/2013  Ait Bouziad ........... A47J 31/44
                                                          99/452
(Continued)

FOREIGN PATENT DOCUMENTS

EP      1197175 A1    4/2002
WO   2004045351 A1    6/2004
(Continued)

OTHER PUBLICATIONS

International Search Report dated Oct. 11, 2018; International Application No. PCT/EP2018/070238; International Filing Date: Jul. 25, 2018; 4 pages.
(Continued)

*Primary Examiner* — Jimmy Chou
*Assistant Examiner* — Thao Uyen Tran-Le
(74) *Attorney, Agent, or Firm* — Blank Rome LLP

(57) ABSTRACT

A milk frother (1) including a container having a chamber (2) for containing milk, a mixing chamber (3) equipped with an external dispenser (4) for dispensing the milk, a connecting channel (5) for connection between the containment chamber (2) and the mixing chamber (3), a transfer impeller (6) for transferring the milk from the containment chamber (2) to the mixing chamber, a mixing impeller (8) provided in the mixing chamber (3), and disconnectable connector (9) for connecting the transfer impeller (6) and the mixing impeller (8).

15 Claims, 10 Drawing Sheets

(58) Field of Classification Search
CPC ........ A47J 43/0722; A47J 43/12; A47J 31/04;
A47J 31/043; A47J 31/047; A47J 31/053;
A47J 31/10; A47J 31/40; A47J 31/402;
A47J 31/41; A47J 43/0465; A01J 11/04
See application file for complete search history.

(56) References Cited

U.S. PATENT DOCUMENTS

2016/0345771 A1* 12/2016 Caruso .................... A47L 13/12
2017/0127875 A1* 5/2017 Savioz ................ A47J 31/4485

FOREIGN PATENT DOCUMENTS

| WO | 2006136268 | A1 | 12/2006 |
| WO | 2012010370 | A1 | 1/2012 |
| WO | 2015197509 | A1 | 12/2015 |

OTHER PUBLICATIONS

Written Opinion dated Oct. 11, 2018; International Application No. PCT/EP2018/070238; International Filing Date: Jul. 25, 2018; 7 pages.
English translation; European Published Application No. EP1197175; Publication Date: Apr. 17, 2002; 9 pages.

* cited by examiner

MILK FROTHER AND COFFEE MACHINE THAT INCORPORATES SUCH A MILK FROTHER

RELATED APPLICATIONS

This application is a U.S. national phase application of International Application No. PCT/EP2018/070238, filed Jul. 25, 2018; which application claims priority to Italy Application No. 102017000086645, filed Jul. 27, 2017. Each of the above-identified related applications are incorporated by reference.

FIELD OF USE

The present invention relates to a milk frother with high flexibility of use and a coffee machine incorporating such a milk frother.

BACKGROUND OF THE INVENTION

Electric milk frothers are widespread on the market comprising a container inside which a mixing impeller is installed that mixes the milk with air for achieving the desired degree of froth.

Once milk has been produced with the desired quantity of froth, the user grips the container and by tipping it pours the contents into an empty cup or where the coffee has already been dispensed for obtaining a cappuccino.

A different type of milk frother envisages a heating and frothing circuit connectable to the steam circuit of a coffee machine.

This type of milk frother can be prone to poor temperature control and foam quality with the consequent negative effects on the organoleptic properties of the beverage produced.

In fact, the final temperature and quality of the foam is influenced by variations in the pressure of the vapour generated by the coffee machine, variations in the coffee machine power supply voltage, and variations in the performance of the coffee machine boiler, for example connected with the gradual accumulation of limescale that reduces the transmission of heat.

SUMMARY OF THE INVENTION

The technical task of the present invention is, therefore, to provide a milk frother which obviates the above-described technical drawbacks of the prior art.

Within the context of this technical task an object of the invention is that of realizing a milk frother with high flexibility of use that can be used for producing a variety of milk based beverages.

Another object of the invention is that of realizing a milk frother that can be used with a coffee machine for the automated production of a variety of milk based beverages.

A further but not least object of the invention is that of realizing a milk frother that can be used with a coffee machine for the final control of the organoleptic properties of a variety of milk based beverages.

The technical task, as well as these and other objects, according to the present invention, are reached by realizing a milk frother characterized in that it comprises a container that has a chamber for containing the milk, a mixing chamber equipped with an external dispenser for dispensing the milk, a connecting channel for connection between the containment chamber and the mixing chamber, a transfer impeller for transferring the milk from the containment chamber to the mixing chamber, a mixing impeller provided in the mixing chamber, and disconnectable connection means for connection between said transfer impeller and said mixing impeller.

When connected, the connection means makes the mixing impeller solidly constrained in rotation with the transfer impeller, and when not connected, it does not transfer the rotation of the transfer impeller to the mixing impeller.

In a preferred embodiment of the invention, said mixing chamber is positioned above said containment chamber.

In a preferred embodiment of the invention said connecting channel extends vertically into said containment chamber from a lower bottom of said containment chamber to an upper bottom of said mixing chamber.

In a preferred embodiment of the invention said impellers are arranged coaxially with a vertical axis.

In a preferred embodiment of the invention said mixing impeller is axially movable.

In a preferred embodiment of the invention said transfer impeller is positioned within said connecting channel at said lower bottom of said containment chamber.

In a preferred embodiment of the invention said transfer impeller has a rotation shaft that extends internally within said connecting channel.

In a preferred embodiment of the invention said transfer impeller has a magnetic means for receiving the rotation.

In a preferred embodiment of the invention said disconnectable connection means is magnetic.

The present invention also discloses a device for preparing a beverage comprising such a milk frother and a coffee machine comprising a coffee dispensing unit having an external coffee dispenser oriented towards an underlying area for dispensing it in a cup, said coffee machine comprising a housing seat in which said milk frother is housed with said external milk dispenser also oriented towards said dispensing area.

Advantageously said machine has a means for heating said mixing chamber.

In a preferred embodiment of the invention said machine has a manual mechanism for disconnecting said connection means.

The invention therefore provides a special milk frother that combined with a specifically adapted coffee machine is able to automatically dispense a variety of milk based beverages directly into a cup.

In particular, by activating or deactivating the heating means and by switching the connection means between the connected position and the disconnected position, it is possible to obtain cold milk without froth, cold milk with froth, hot milk without froth, hot milk with froth, cappuccino, latte.

Advantageously, due to the fact that the frothing and heating of the milk are independent operations performed with independent means, the invention guarantees the production of a milk based beverage whose temperature and quality can be finely controlled.

Other characteristics of the present invention are further defined in the following claims.

BRIEF DESCRIPTION OF THE DRAWINGS

Further characteristics and advantages of the invention will more fully emerge from the description of a preferred but not exclusive embodiment of the milk frother and coffee machine in which the milk frother is incorporated according to the invention, illustrated by way of non-limiting example in the accompanying drawings, in which.

DETAILED DESCRIPTION OF THE ILLUSTRATED EMBODIMENTS

Figure 1:
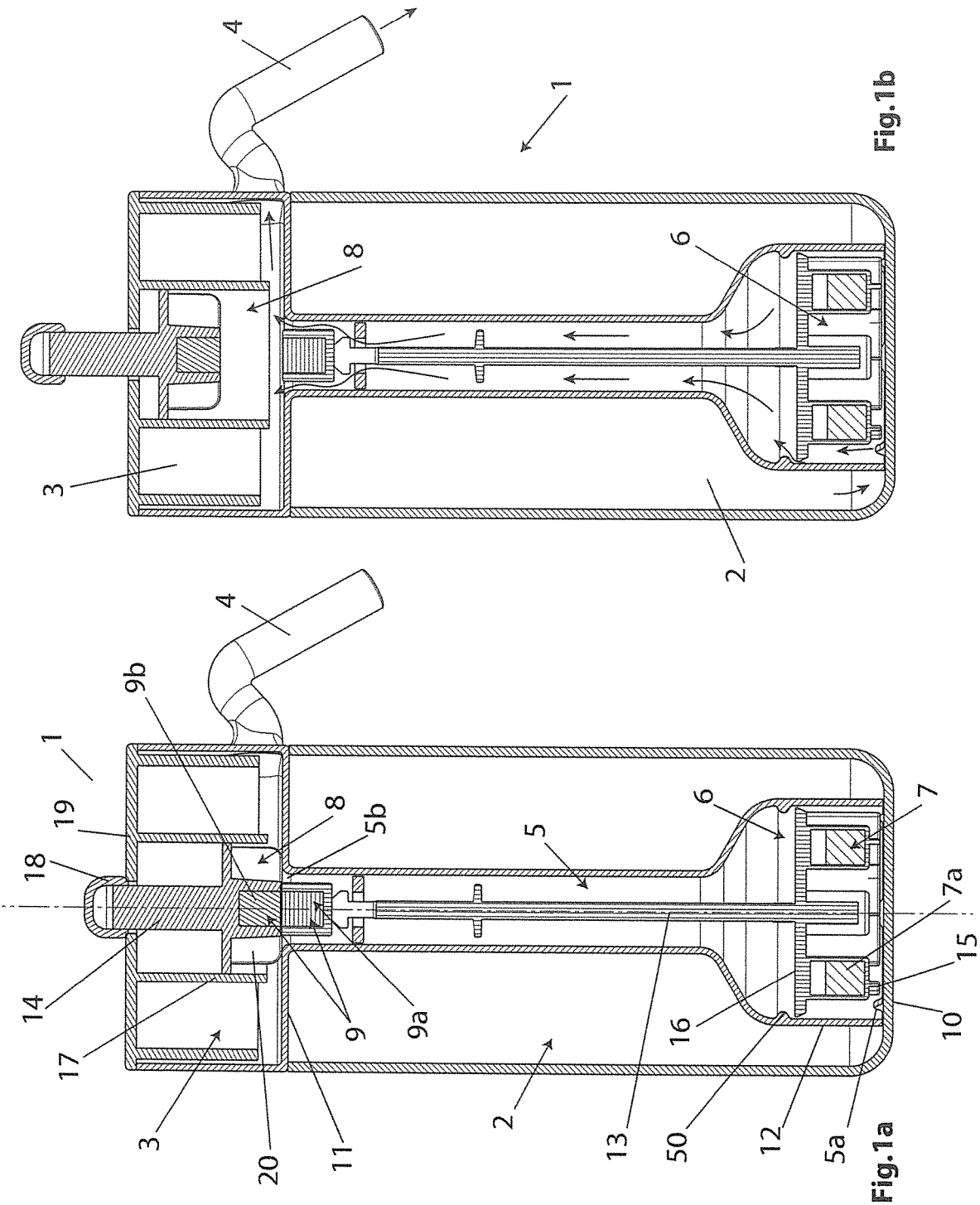
FIG. 1a shows a vertical section of the milk frother with the connection means active.
FIG. 1b shows a vertical section of the milk frother with the connection means not active.
Figure 2:
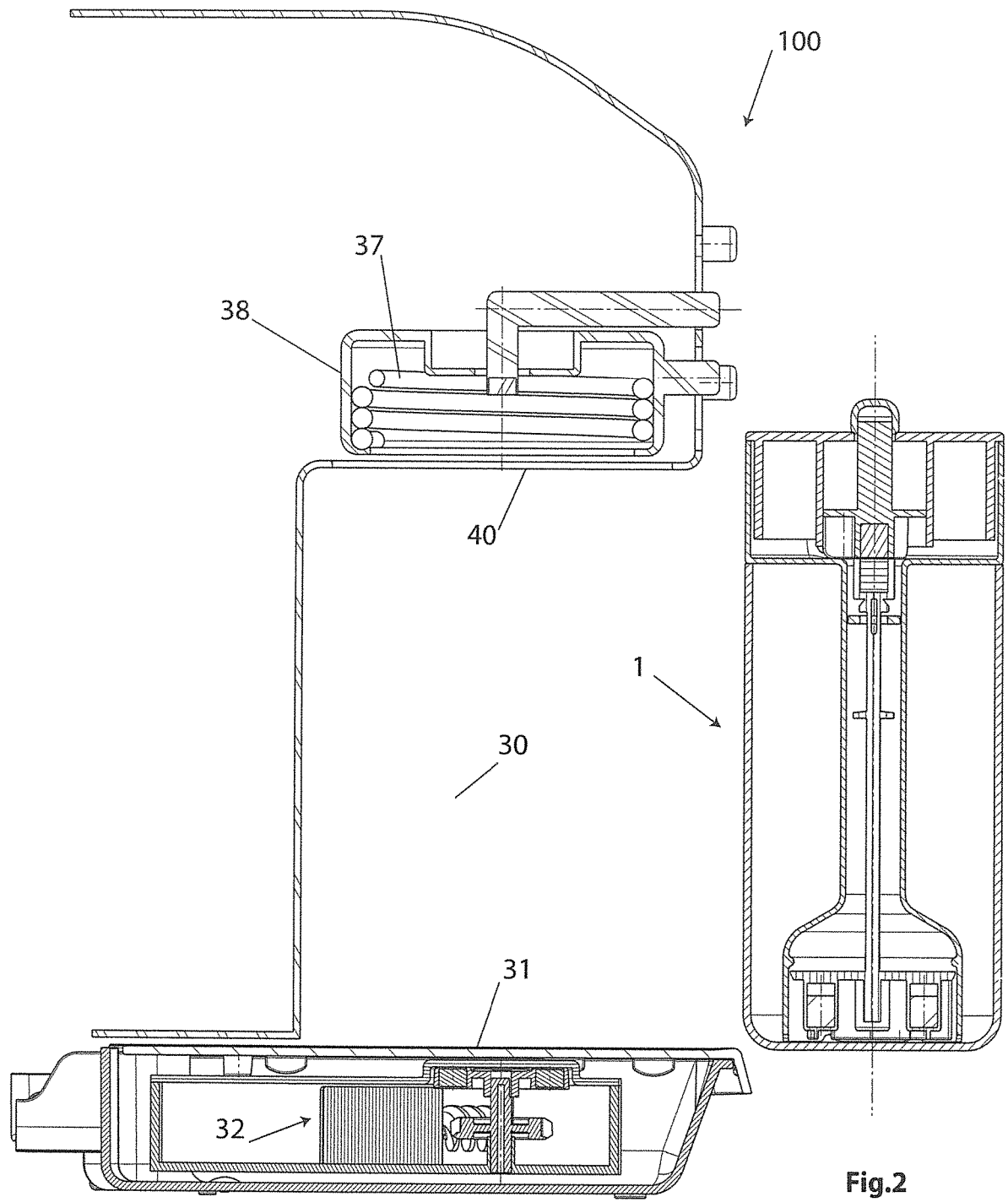
FIG. 2 shows a lateral raised view of a vertical section of the milk frother and of the coffee machine separated.
Figure 3:
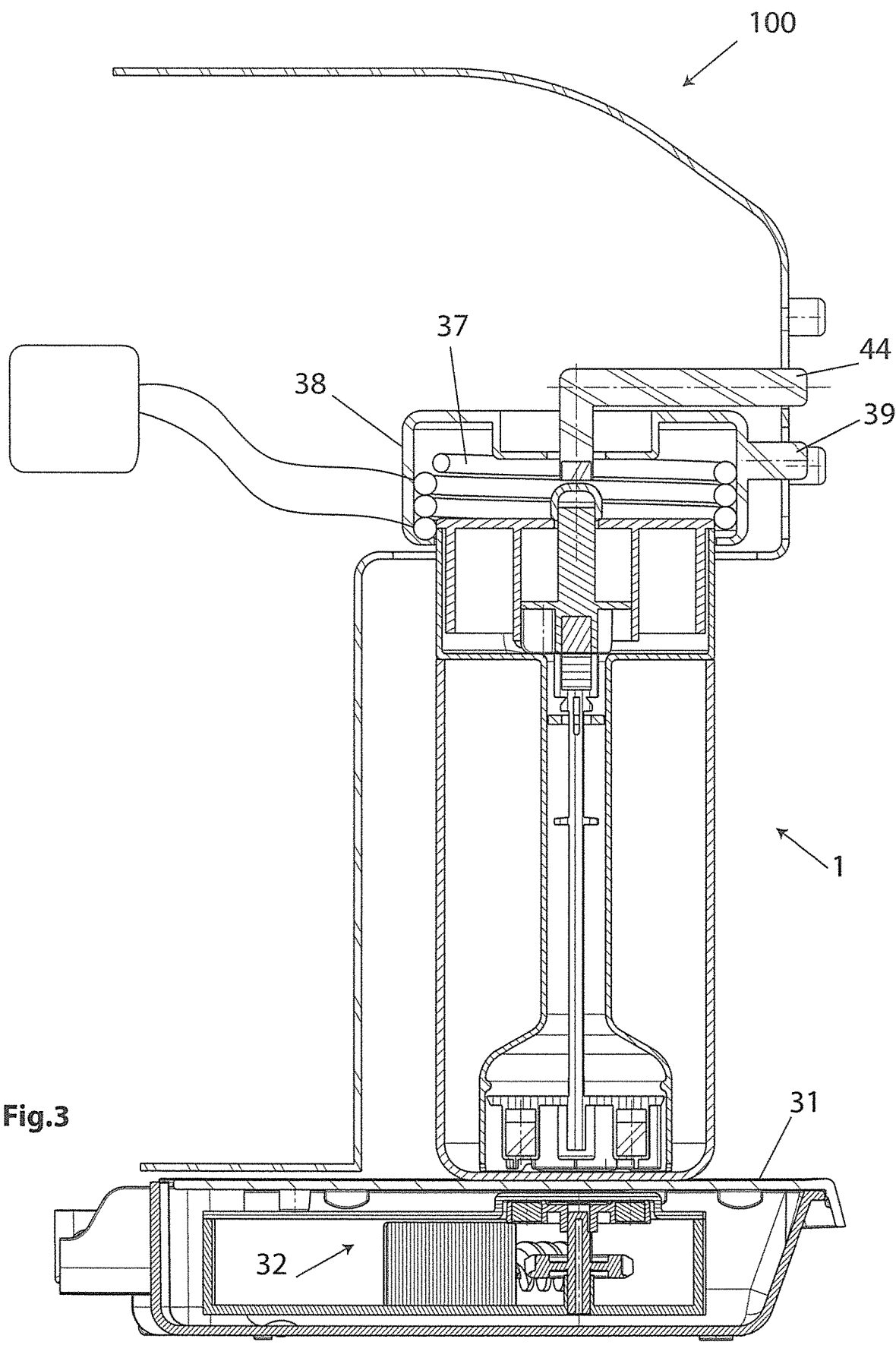
FIG. 3 shows a lateral raised view of a vertical section of the milk frother and of the coffee machine connected, with the heating means inactive and the connection means active.
Figure 4:
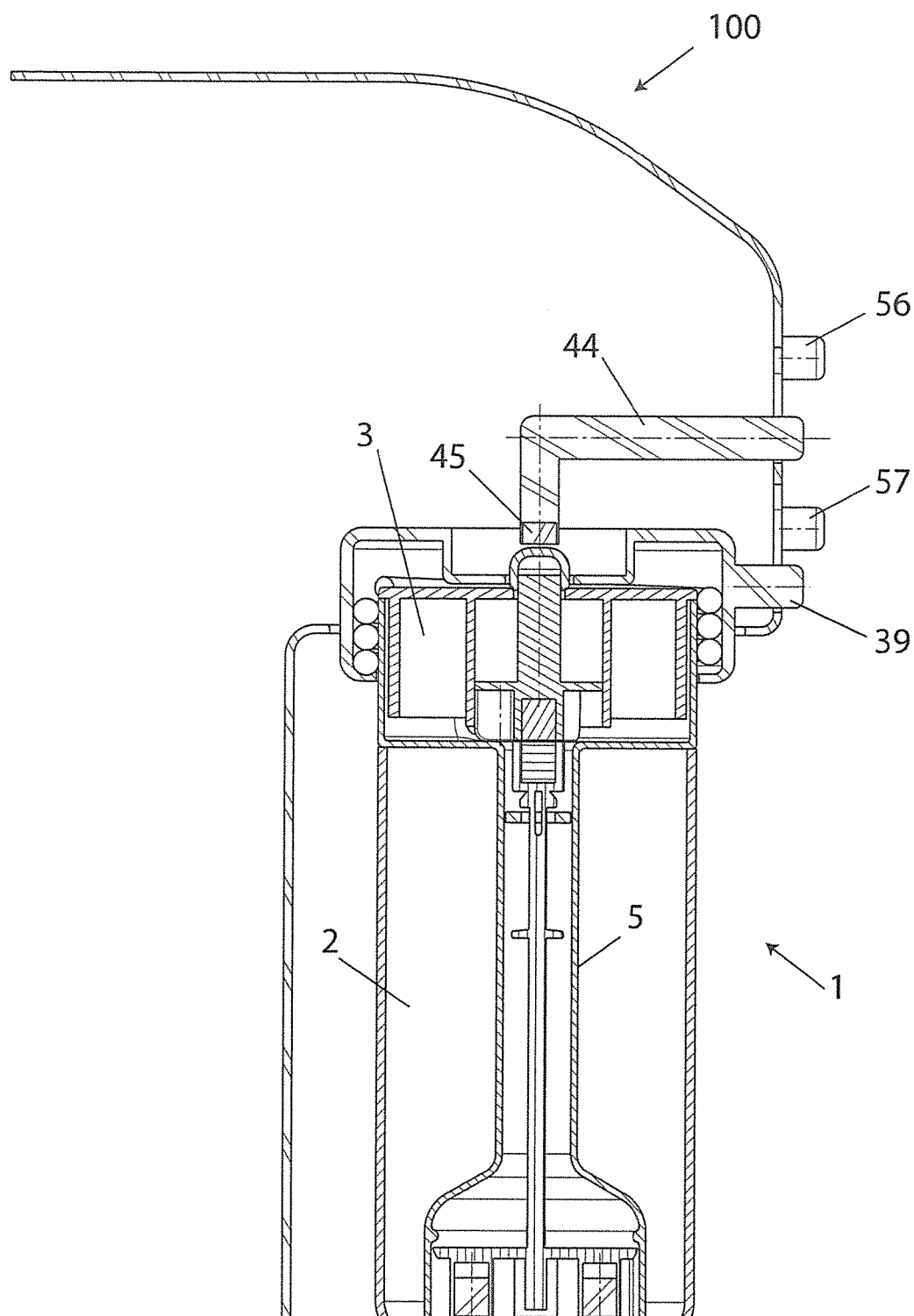
FIG. 4 shows a lateral raised view of a vertical section of the milk frother and of the coffee machine connected, with the heating means active and the connection means active.
Figure 5:
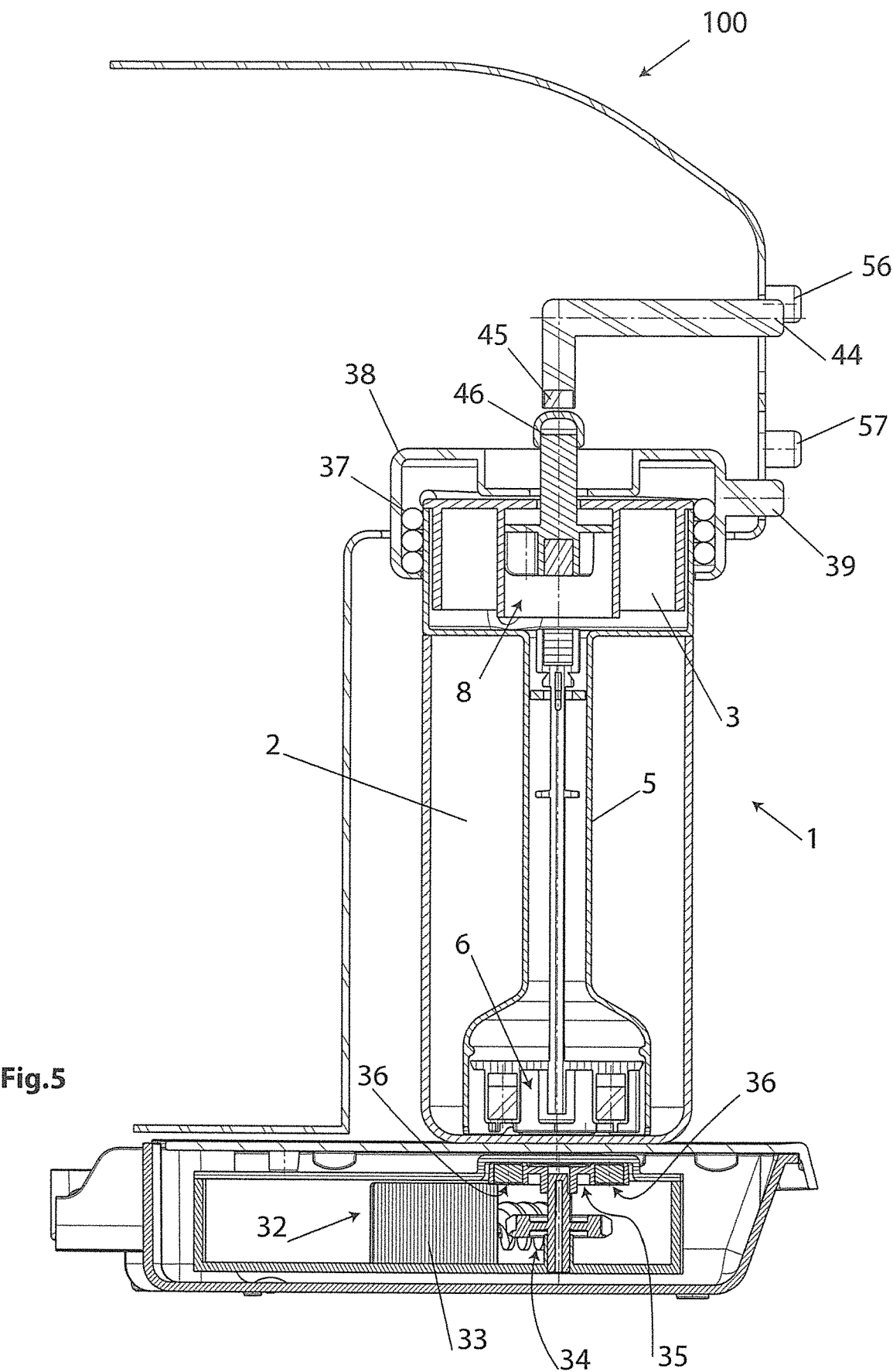
FIG. 5 shows a lateral raised view of a vertical section of the milk frother and of the coffee machine connected, with the heating means active and the connection means inactive.
Figure 6:
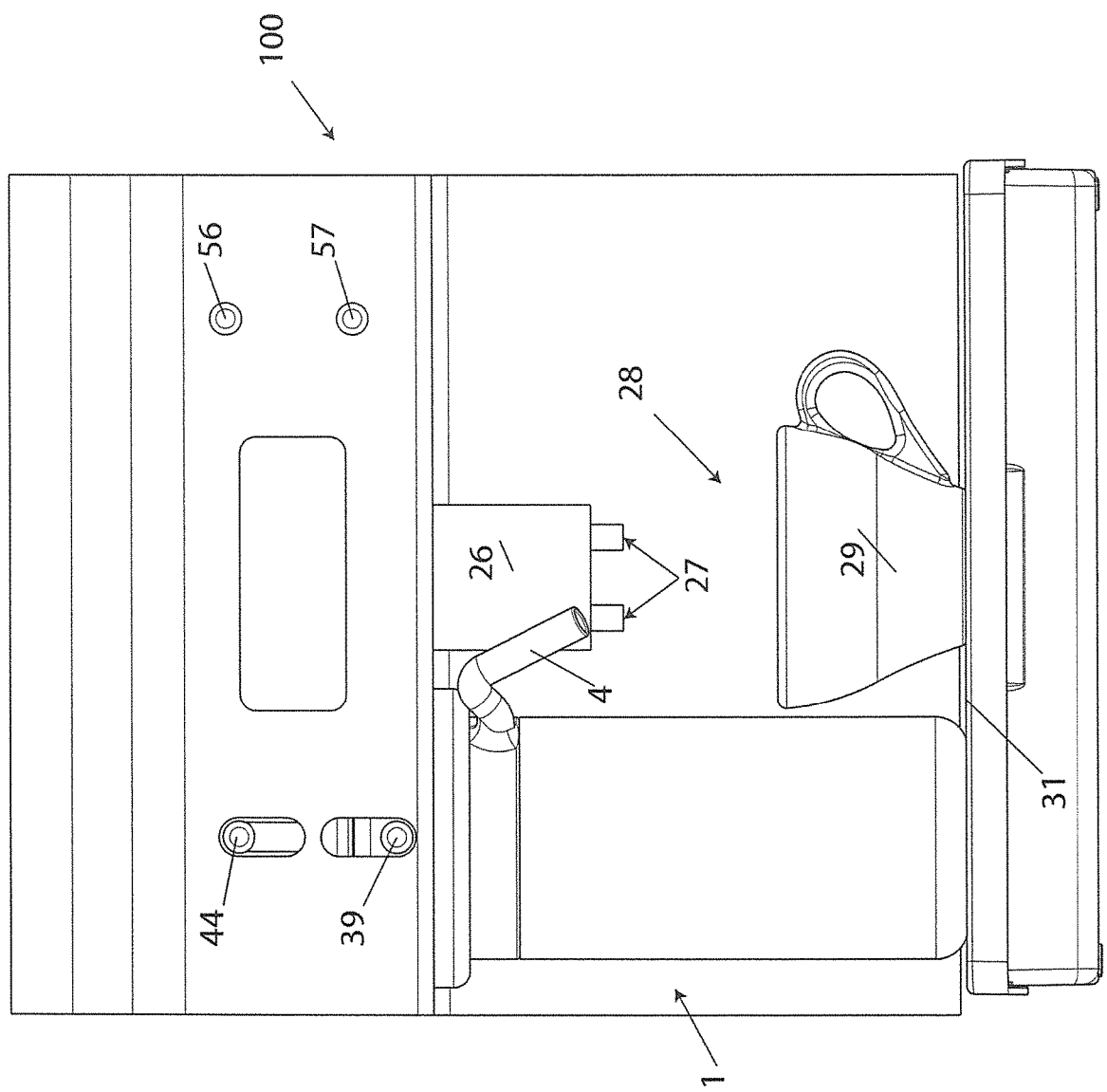
FIG. 6 shows a front view of the milk frother and of the coffee machine connected.
Figure 7:
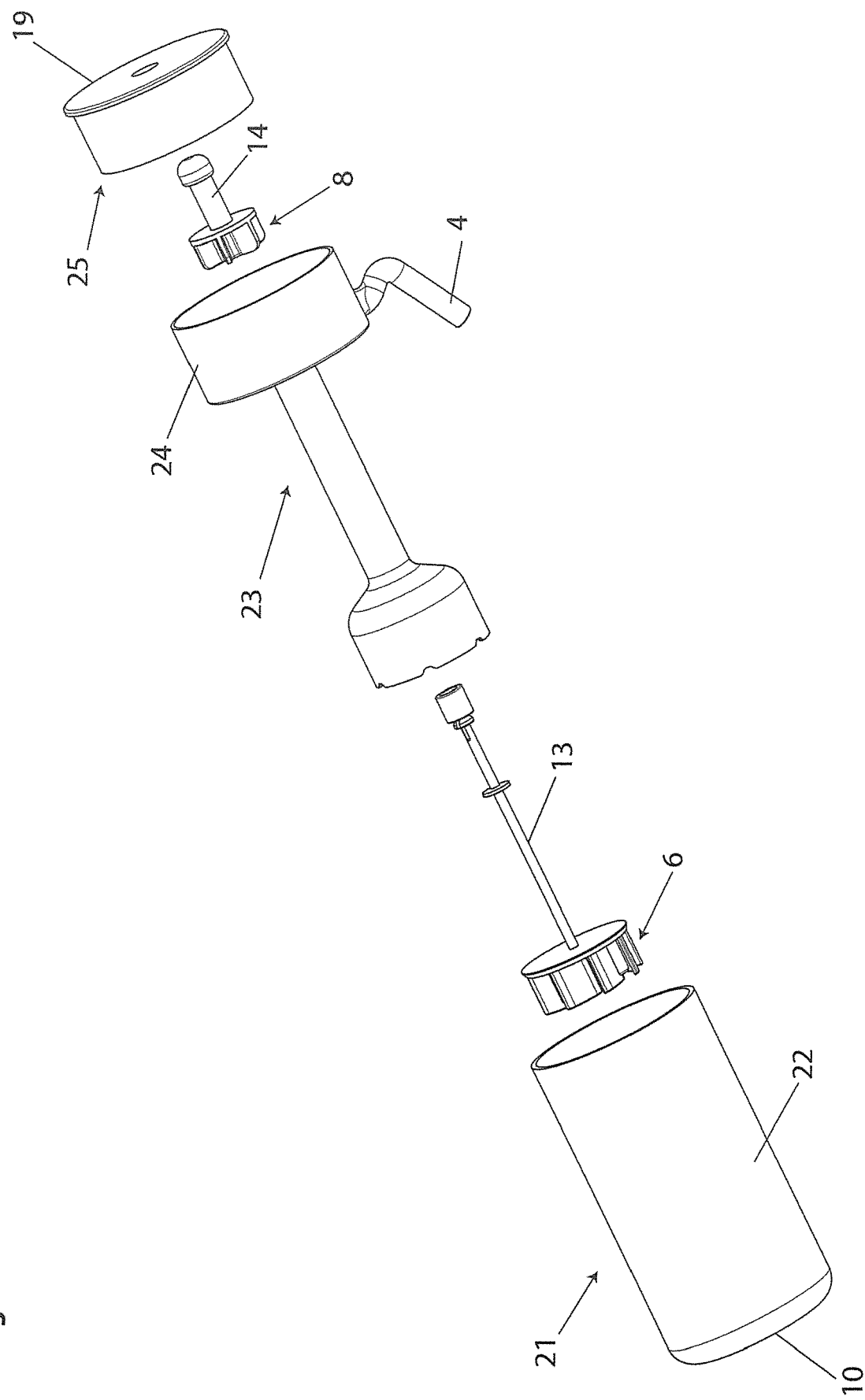
FIG. 7 shows an exploded view of the milk frother.
Figure 8:
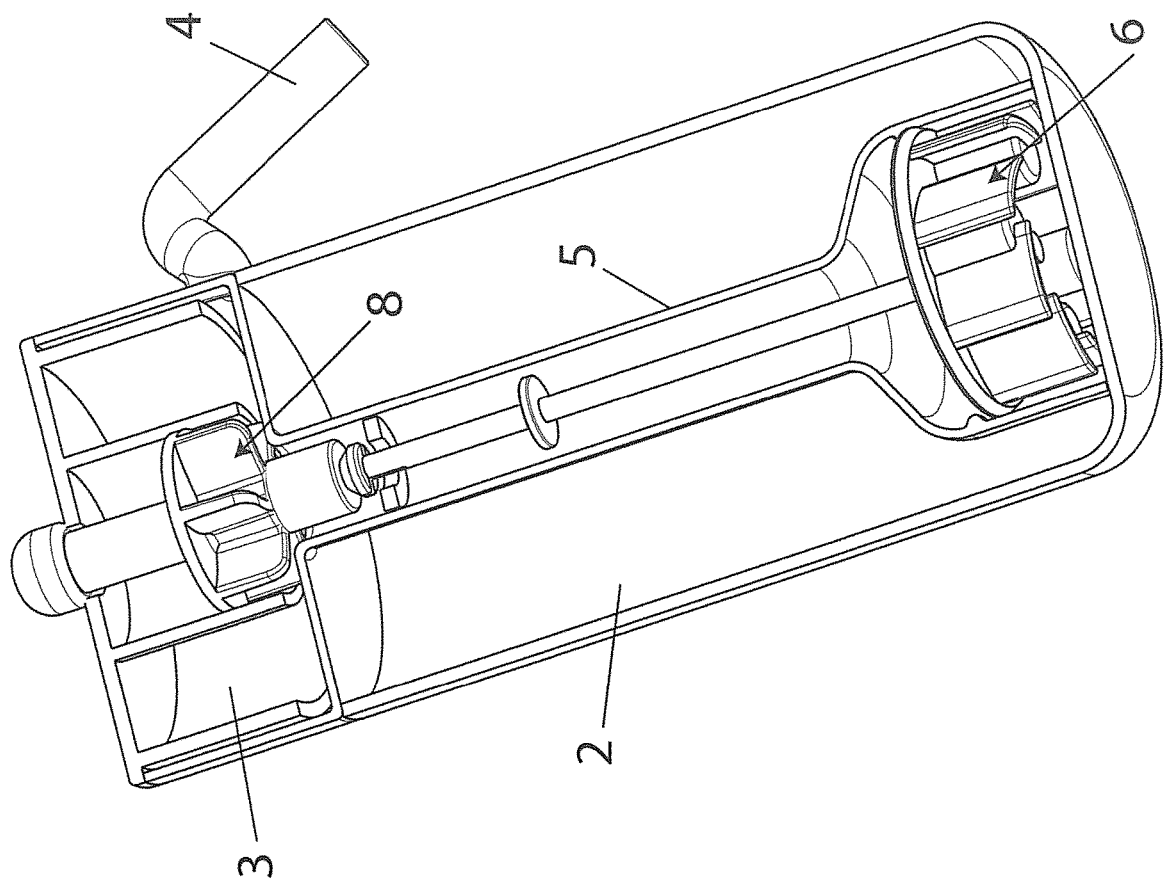
FIG. 8 shows a perspective view of the milk frother sectioned.
Figure 9:
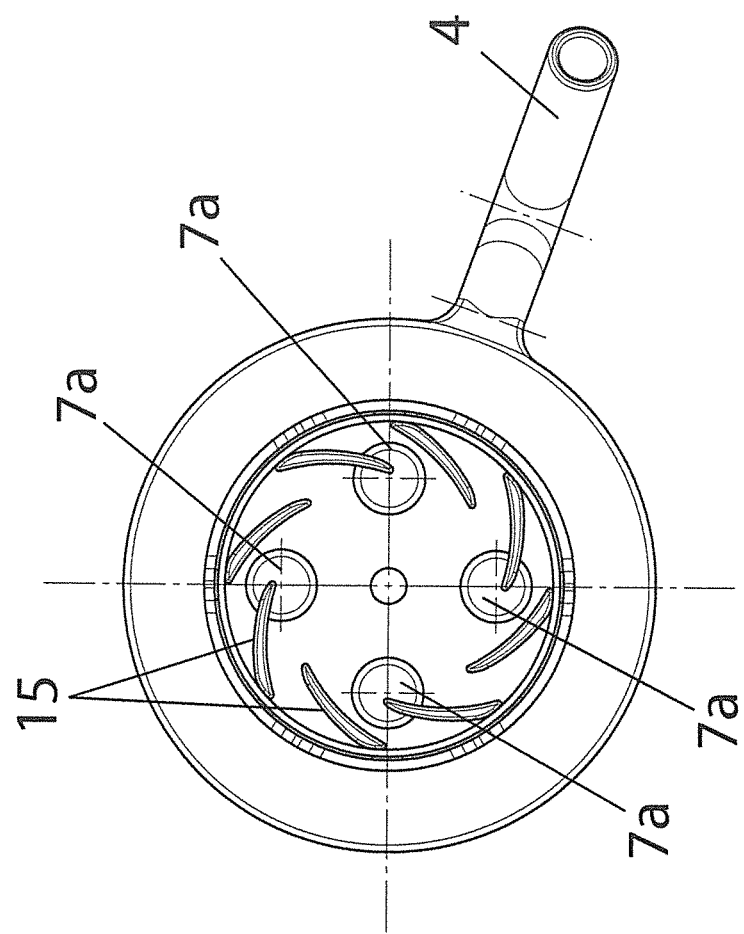
FIG. 9 shows a view from below of the milk frother from which, for convenience purposes, the lower bottom of the milk containment chamber has been removed.

With reference to the figures mentioned, a milk frother is shown indicated overall with the reference number 1.

The milk frother 1 comprises a container that has a chamber 2 for containing the milk, a mixing chamber 3 equipped with an external dispenser 4 for dispensing the milk, a connecting channel 5 for connection between the containment chamber 2 and the mixing chamber 3.

Within the container a transfer impeller 6 is also provided for transferring the milk from the containment chamber 2 to the mixing chamber 3 and a mixing impeller 8 positioned in the mixing chamber 3.

The mixing chamber 3 is positioned above the containment chamber 2. The connecting channel 5 extends vertically within the containment chamber 2 from the lower bottom 10 of the containment chamber 2 to the lower bottom 11 of the mixing chamber 3 and has a lower pathway 5a for the radial inlet of the milk and an upper pathway 5b for the axial outlet of the milk.

The transfer impeller 6 is positioned in particular on the lower bottom 10 of the containment chamber 2 inside an enlarged lower end portion 12 of the connecting channel 5.

The transfer impeller 6 has blades 15 supported on one side of a base 16 and a vertical rotation shaft 13 supported on the opposite side of the base 16.

The blades 15 rest on the lower bottom 10 of the containment chamber 2 while the rotation shaft 13 extends within the connecting channel 5 towards the outlet pathway 5b of the connecting channel 5.

On the inner side of the enlarged lower end portion 12 of the connecting channel 5, a perimeter stopping shoulder 50 is afforded above the transfer impeller 6, which intercepts the transfer impeller 6 preventing the lifting thereof.

The transfer impeller 6 is also equipped with a magnetic means 7 for receiving the rotation.

The magnetic means 7 for receiving the rotation is in particular formed by permanent magnets 7a supported on the base 16 on the side where the blades 15 are provided.

The mixing impeller 8 has a rotation shaft 14 arranged coaxially above the rotation shaft 13 of the transfer impeller 6.

The rotation shaft 14 of the mixing impeller 8 exits with its upper end outside the milk frother 1 through a through hole 18 in the upper wall 19 of the mixing chamber 3.

The mixing impeller 8 is supported in an axially movable way.

In particular, an axial translation guide 17 is provided in the mixing chamber 3 for the mixing impeller 8.

The mixing impeller 8 can translate between a connected position with the transfer impeller 6, in which with its blades 20 it rests on the lower bottom 11 of the mixing chamber 3, and a disconnected position from the transfer impeller 6, in which it is raised at a distance from the lower bottom 11 of the mixing chamber 3.

Advantageously, a disconnectable connection means 9 is provided between the transfer impeller 6 and the mixing impeller 8.

In particular, the disconnectable connection means 9 is of the magnetic type and comprises for example a permanent magnet 9a fixed to the upper end of the rotation shaft 13 of the transfer impeller 6 and a permanent magnet 9b fixed to the lower end of the rotation shaft 14 of the mixing impeller 8.

The permanent magnets 9a, 9b are oriented coaxially with a vertical magnetic axis and magnetic poles arranged in series so as to exercise a mutual force of attraction that allows the rotation shaft 13 of the transfer impeller 6 to engage and draw in rotation by friction the rotation shaft 14 of the mixing impeller 8.

The upper end of the rotation shaft 14 of the mixing impeller 8 can be grasped from the outside of the container for lifting the mixing impeller 8 to the disconnected position.

The container of the milk frother 1 is formed, by way of example, by three structurally independent parts that can be disassembled and, more precisely, a first part 21 that defines the flat lower bottom 10 and a cylindrical side wall 22 of the containment chamber 2, a second part 23 that defines the connecting channel 5, the flat lower bottom 11 of the mixing chamber 3 coinciding with the upper wall of the containment chamber 2, a cylindrical side wall 24 of the mixing chamber 3 and the external dispenser 4, and a third part 25 that defines the upper wall 19 of the mixing chamber 3.

The milk frother 1 cooperates with a coffee machine 100 for producing a variety of beverages.

The coffee machine 100 comprises a coffee dispensing unit 26 having an external coffee dispenser 27 oriented towards an underlying dispensing area 28 where a cup 29 can be positioned.

The coffee machine 100 comprises a housing seat 30 in which the milk frother 1 is housed with the external milk dispenser 4 oriented towards the dispensing area 28.

The housing seat 30 has a support surface 31 of the milk frother 1 beneath which a specific means 32 is installed for activation of the transfer impeller 6 in rotation.

The support surface 31 of the milk frother 1 is positioned frontally in the coffee machine 100 on the extension of the support surface of the cup 29.

The activation means 32 comprises a motor 33 and a gear transmission 34 that connects to the motor 33 a wheel 35 having a vertical axis with permanent magnets 36 interacting with the permanent magnets 7a to generate a rotation torque on the transfer impeller 6.

Advantageously the coffee machine 100 has a means for heating the mixing chamber 3.

The heating means illustrated in FIGS. 1-9 comprises an induction coil 37.

The induction coil 37 is mounted in a support 38 that is vertically movable through a manual control lever 39.

The induction coil 37 can assume an upper position in which it is decoupled from the mixing chamber 3 and a lower position in which it is coupled, in particular fitted onto the mixing chamber 3 which in the illustrated case is made of a metal or another electrically conductive material suitable for heating through electromagnetic induction.

In the upper position the induction coil 37 is retracted inside an upper wall 40 of the housing seat 30.

Figure 10:
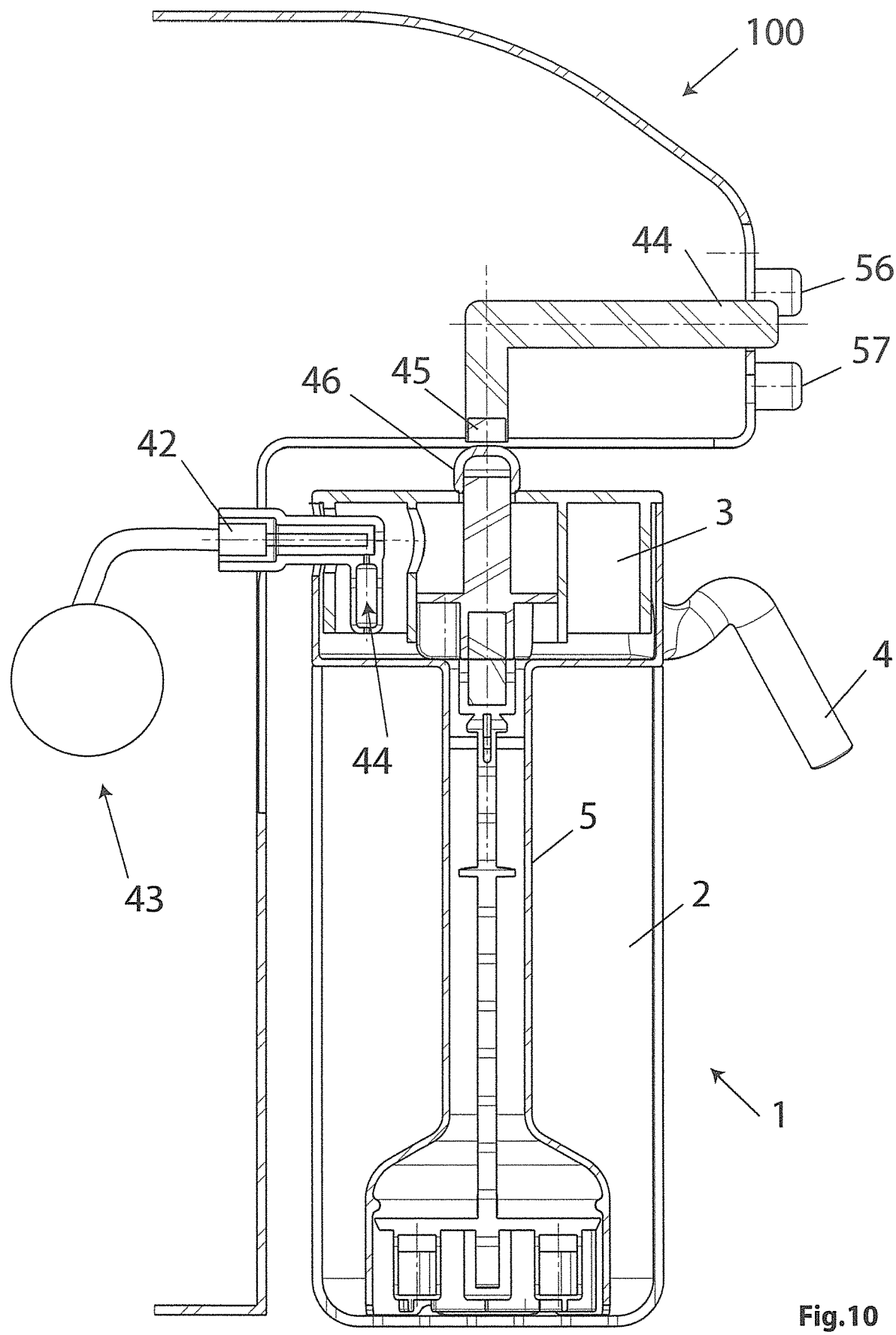
FIG. 10 shows a lateral raised view of a vertical section of the milk frother and of the coffee machine connected, in a variant of the heating means.

In FIG. 10 the means for heating the mixing chamber 3 is of the steam type and comprises a steam injector 41 mounted in the mixing chamber 3 and connectable to the external steam dispenser 42 normally provided in the steam production circuit 43 of the coffee machine 100.

Possibly the heating means can assume other shapes, e.g. it can comprise electrical resistors applied to the mixing chamber 3.

The coffee machine 100 finally has a manual disconnection mechanism of the connection means 9.

The manual disconnection mechanism illustrated is preferably but not necessarily of the magnetic type and in particular comprises a manual control lever 44 bearing at one end a permanent magnet 45 that engages in a permanent magnetic way a relevant magnetic or ferromagnetic formation 46 mounted on the upper end of the rotation shaft 14 of the mixing impeller 8.

The manual control lever 44 can translate vertically above the milk frother 1 between an upper position in which the mixing impeller 8 is disconnected from the transfer impeller 6 and a lower position in which the mixing impeller 8 is connected to the transfer impeller 6.

The operation of the milk frother 1 combined with the coffee machine 100 according to the invention appears clear from the description and illustration and, in particular, is substantially as follows.

With reference to FIGS. 1-9, the user sets the milk based beverage through the control levers 39, 44.

The pathway of the milk into the milk frother 1 is indicated by relevant arrows.

To obtain hot milk without froth the user brings the control lever 44 into the upper position and the control lever 39 into the lower position, and presses a first cycle start button 56 on the coffee machine 100 dashboard.

In the lowered position the control lever 39 activates a microswitch of the coffee machine 100 (not shown) which sends an activation signal of the induction coil 37 to the electronic control unit of the coffee machine 100.

The electronic control unit of the coffee machine 100, as well as the induction coil 37, also activates the activation means 32 of the transfer impeller 6. The transfer impeller 6 sucks the milk from the containment chamber 2, makes it ascend through the connecting channel 5 and conveys it into the heated mixing chamber 3 where the mixing impeller 8 is instead stationary, and from there the milk that has been heated but not emulsified with air is conveyed to the external dispenser 4 which finally dispenses it directly into the cup 29.

To obtain cold milk without froth the user brings both the control lever 44 and the control lever 39 into the upper position and still presses the same first cycle start button 56.

In the raised position the control lever 39 does not activate the microswitch which in turn does not therefore send the induction coil activation signal 37.

The electronic control unit of the coffee machine 100 activates the activation means of the transfer impeller 6. The transfer impeller 6 sucks the milk from the containment chamber 2, makes it ascend through the connecting channel 5 and conveys it into the unheated mixing chamber 3 where the mixing impeller 8 is still stationary, and from there the cold milk not emulsified with air is conveyed to the external dispenser 4 which finally dispenses it directly into the cup 29.

To obtain hot milk with froth the user brings both the control lever 44 and the control lever 39 into the lower position and presses again the same first cycle start button 56.

In the lowered position the control lever 39 activates the microswitch (not shown) which sends the activation signal of the induction coil 37 to the electronic control unit of the coffee machine 100.

The electronic control unit of the coffee machine 100 activates the activation means of the transfer impeller 6. The transfer impeller 6 sucks the milk from the containment chamber 2, makes it ascend through the connecting channel 5 and conveys it into the heated mixing chamber 3 where the mixing impeller 8 is now in rotation for mixing the milk with air, and from there the milk that has been heated and emulsified with air is conveyed to the external dispenser 4 which finally dispenses it directly into the cup 29.

To obtain a cappuccino the user brings both the control lever 44 and the control lever 39 into the lower position and presses a second cycle start button 57 different from the first button.

With respect to the hot frothy milk production cycle in this case the electronic control unit of the coffee machine 100 also activates the coffee dispensing unit 26 which, like the milk that has been heated and emulsified with air, is conveyed directly into the cup 29.

To obtain a latte the user brings the control lever 44 into the upper position and the control lever 39 into the lower position and presses the same second cycle start button 57.

With respect to the hot but not frothy milk production cycle in this case the electronic control unit of the coffee machine 100 also activates the coffee dispensing unit 26 which, like the milk that has been heated but not emulsified with air, is conveyed directly into the cup 29.

The milk frother as conceived herein is susceptible of numerous modifications and variants, all falling within the scope of the inventive concept; furthermore, all the details are replaceable by technically equivalent elements.

In practice the materials used, as well as the dimensions, can be any according to the needs and the state of the art.

The invention claimed is:

1. A milk frother (1) comprising:
   a container that has a containment chamber (2) for containing milk,
   a mixing chamber (3) equipped with an external dispenser (4) for dispensing the milk,
   a connecting channel (5) for connection between the containment chamber (2) and the mixing chamber (3),
   a transfer impeller (6) for transferring the milk from the containment chamber (2) to the mixing chamber (3),
   a mixing impeller (8) provided in the mixing chamber (3), and
   a connector (9), providing disconnectable connection between said transfer impeller (6) and said mixing impeller (8); wherein:

said mixing chamber (3) is positioned above said containment chamber (2) to receive an ascending flow of milk from said containment chamber (2); and said connecting channel (5) extends vertically within said containment chamber (2) from a lower bottom (10) of said containment chamber (2) to a lower bottom (11) of said mixing chamber (3), the transfer impeller configured to lift the milk from the lower bottom (10) of said containment chamber (2), so that the milk rises through said connecting channel (5) to the lower bottom (11) of said mixing chamber (3).

2. The milk frother (1) according to claim 1, wherein said transfer impeller (6) and said mixing impeller (8) are arranged coaxially with a vertical axis.

3. The milk frother (1) according to claim 2, wherein said mixing impeller (8) is axially movable.

4. The milk frother (1) according to claim 1, wherein said transfer impeller (6) is positioned within said connecting channel (5) at said lower bottom (10) of said containment chamber (2).

5. The milk frother (1) according to claim 1, wherein said transfer impeller (6) has a rotation shaft (13) that extends internally within said connecting channel (5).

6. The milk frother (1) according to claim 1, wherein said transfer impeller (6) has a magnetic means (7) for receiving the rotation.

7. The milk frother (1) according to claim 6, wherein said magnetic means (7) for receiving the rotation comprises permanent magnets (7a) that are fixed to said transfer impeller (6).

8. The milk frother (1) according to claim 1, wherein said connector (9) is magnetic.

9. The milk frother (1) according to claim 8, wherein said connector (9) comprises permanent magnets (9a, 9b) that are interacting and fixed to adjacent ends of a rotation shaft (13) shafts of said transfer impeller (6) and a rotation shaft (14) of said mixing impeller (8).

10. The milk frother (1) according to claim 1, wherein a rotation shaft (14) of said mixing impeller (8) extends outside of said container.

11. A device for preparing a beverage and comprising a milk frother (1) according to claim 1, and a coffee machine (100) comprising a coffee dispensing unit (26) having an external coffee dispenser (27) oriented towards an underlying dispensing area (28) for dispensing into a cup (29), said coffee machine (100) comprising a housing seat (30) in which said milk frother (1) is housed with said external dispenser (4) also oriented towards said underlying dispensing area (28).

12. The device for preparing a beverage according to claim 11, wherein said coffee machine (100) has a heater configured to heat said mixing chamber (8).

13. The device for preparing a beverage according to claim 12, wherein said heater comprises steam, induction or electrical resistance heating.

14. The device for preparing a beverage according to claim 13, wherein said housing seat (30) has a support surface (31) for said container, and beneath said support surface (31), said coffee machine (100) has means (32) for magnetic activation of said transfer impeller (6) in rotation.

15. The device for preparing a beverage according to claim 11, wherein said coffee machine (100) has a manual switch for disconnecting said connector (9).

* * * * *